Patented Aug. 11, 1942

2,292,841

UNITED STATES PATENT OFFICE 2,292,841

METHOD OF OBTAINING A THERAPEUTIC PRODUCT FOR INHIBITING GASTRIC MOTILITY AND SECRETION

Heinrich Necheles, Chicago, Ill., assignor to Michael Reese Research Foundation, Chicago, Ill., a corporation of Illinois No Drawing. Application March 11, 1939, Serial No. 261,307

5 Claims. (Cl. 167—74)

The invention relates to a preparation for inhibiting gastric motility and secretion, and to a process of producing the same.

It is known that a substance which inhibits gastric motility and secretion is present in the intestines of dogs and other animals, and may also be present in other tissues. Hitherto attempts have been made to obtain the substance from the intestines by extraction and precipitation from the extract. As far as I know, however, the substance has never been obtained in its pure state, but has always been present with other substances, some of which, such as histamine, promote secretion or have other detrimental effects.

Moreover, methods of obtaining an inhibiting substance from the intestines are not commercially satisfactory, since the amount of even the crude precipitate obtained from the extract is very small. When it is considered that the crude precipitate must be dissolved and reprecipitated several times before it can be used for inhibiting purposes, and that then the composition obtained may be very unsatisfactory, it is apparent, that the preparation of large quantities of a suitable inhibiting composition by such means would be extremely costly.

During some of my early work on the preparation of biodialysates from the blood of dogs, for the purpose of producing an increase of gastric and pancreatic secretion, I observed that in some cases inhibition, instead of increase of gastric secretion, followed injection of the preparations.

This observation of the occurrence of a secretion inhibiting substance in the blood, together with the knowledge of excretion of sex hormones in urine, led to my discovery that urine contained a relatively large proportion of a substance or substances which inhibited gastric motility and secretion, and that this substance or a composition containing this substance which was substantially free of deleterious ingredients could be obtained from urine by simple and economical methods.

In accordance with my invention, I separate the protein substance of urine from the non-protein substance, and recover the protein substance. The protein constituents of urine contain the substance in urine which inhibits gastric motility and secretion. Therefore in making a medicinal composition for inhibiting gastric motility and secretion the protein constituents of urine, preferably further treated by removal of water insoluble material therefrom, are assayed and standardized on dogs or humans by employing the gastric emptying time of a barium meat meal, reduction of the stimulated gastric secretion, and the balloon method for motility, in accordance with known methods for assaying the enterogastrone product obtained from intestines. The standardized product is then made into suitable portions and packaged in the form of tablets or dissolved in water in ampules, or prepared in other manner for sale and use in the treatment (orally or by injection) of disorders of the stomach and intestines such as hypersecretion, hyperacidity, hypermotility, gastric or duodenal ulcer, and the like.

Suitable urine for the practice of this invention may be obtained from most mammals. Preferably fresh urine from a normal man is used. It is also an advantage that inorganic material such as the heavy earth salts be removed from the urine before treatment to obtain the inhibitor composition. This removal may be done by chilling, alkalinization or other well known methods of removing such salts.

A suitable method of isolating the inhibitor composition from urine is to precipitate the protein constituents from urine by a protein precipitant. The precipitants contemplated include ammonium sulfate, picric acid, tannic acid, phosphotungstic acid, trichloro acetic acid, acetone, alcohol and other precipitants for protein and protein derivative products.

Another method of preparing the therapeutic inhibitor is to adsorb the active substances of urine on colloidal aluminum hydroxide or other adsorbents, removing the adsorbed material, preferably separating the non-protein material therefrom.

In any event when the crude product is obtained from urine by precipitation, adsorption, evaporation or other means, it is preferably treated by dissolving in water and filtering or centrifuging out water insoluble material. The filtrate is then reprecipitated, preferably with alcohol, acetone, or some other liquid which does not either dissolve or deleteriously affect the active inhibitor substance, but which is a solvent for non-protein foreign matter, particularly such foreign matter as may affect blood pressure or counteract the effect of the inhibitor.

To more clearly set forth the practice in accordance with the invention and to more specifically point out the nature of the product and process contemplated thereby, a specific, illustrative example is hereinafter set forth, it being understood that this example illustrates one embodiment which has given satisfactory results, and is not intended to restrict the invention thereto.

*Example*

Fresh human urine is collected without preservative and ammonium sulfate in substance (powdered) is added while the fluid is being stirred. A minimum of 1½% and a maximum of 3% by weight of ammonium sulfate in the urine are the limits within which safe precipitation of the inhibitor occurs. A voluminous proteinogenous precipitation is formed which settles on the bottom of the flask. The fluid is decanted carefully and the precipitate and supernatant fluid are centrifuged until the whole precipitate has settled on the bottom of the flask and is not lost when all the fluid on top is poured off. After this several procedures have been employed successfully to purify the substance. These included precipitation of the substance, redissolved in water, by means of tannic acid, picric acid, trichloracetic acid and simple reprecipitation with ammonium sulfate. The simplest, cheapest and most successful method has been fractional precipitation with alcohol. Eighty-five percent alcohol was the concentration at which all of the inhibitor was precipitated out of the watery solution. Concentrations higher than 85% ethyl alcohol are not necessary, but may be used. This process repeated several times yields a white material which dissolves in water easily and which, even in much larger doses than those employed for inhibition of gastric secretion and motility does not affect blood pressure and respiration when assayed pharmacologically. The product was assayed for depression of secretion using dogs with pouches of the stomach, the secretion of which is stimulated by a meal or by injections of histamine. Assay for depression of motility was done on dogs having a gastric fistula through which a balloon is introduced, which records gastric motility on a drum by way of a manometer, or by measuring gastric emptying time with the fluoroscope. The substance may be administered parenterally or by mouth. A dose of 5 mg. of the inhibitor described above injected intravenously to a dog of 16 kgms. was followed by a 50 per cent depression of gastric motility. On the average 1 mgm. of the inhibitor substance per 3 kgms. of dog is sufficient to produce a remarkable decrease of gastric secretion and motility. The inhibitor product was then standardized and made into portions suitable for sale and use as a therapeutic product. For administering by mouth the substance was enterocoated as it is then more active.

I do not desire to be limited to any theory as to the composition of my product and intend to cover it whether it consists of the active principle in the form of a single protein compound, a mixture of protein compounds, or whether it consists of the active principle adsorbed on the protein or proteins. The term protein is used in the broad sense to include protein and protein degradation products such as the proteoses.

The therapeutic product of my invention gives superior and more uniform results than any enterogastrone product known to me which has been obtained from intestines.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible.

I claim:

1. The method of obtaining a therapeutic product for inhibiting gastric motility and secretion, which comprises admixing urine, which is substantially free from decomposition products produced by boiling, with a protein precipitant to precipitate a substance from urine which inhibits gastric motility and secretion, dissolving the precipitate in an aqueous liquid, precipitating the solution with a protein precipitant, and making the precipitate into a form usable for thereapeutic purposes, all of said steps being carried out without subjecting the composition containing the inhibitor to a boiling temperature for a time sufficient to cause substantial decomposition.

2. The method of obtaining a therapeutic product for inhibiting gastric motility and secretion which comprises admixing urine containing an inhibitor for gastric secretion and motility with ammonium sulfate to form a concentration of ammonium sulfate in solution of between approximately 1½% to 3% by weight ammonium sulfate in the urine, thereby producing a proteinogenous precipitate, dissolving the precipitate in water, and precipitating from the aqueous solution with a protein precipitant.

3. The method of obtaining a therapeutic product for inhibiting gastric motility and secretion which comprises admixing urine containing an inhibitor for gastric secretion and motility with ammonium sulfate to form a concentration of ammonium sulfate in solution of between approximately 1½% to 3% by weight ammonium sulfate, thereby producing a proteinogenous precipitate, dissolving the precipitate in water, removing water insoluble impurities therefrom, and precipitating with alcohol.

4. The method of obtaining a therapeutic product for inhibiting gastric motility and secretion which comprises admixing urine, which is substantially free from decomposition products by boiling with ammonium sulfate to form a concentration of ammonium sulfate in solution of between approximately 1½% to 3% by weight ammonium sulfate, thereby producing a proteinogenous precipitate, dissolving the precipitate in water, removing water insoluble impurities therefrom, and adding alcohol until a concentration of at least 85% alcohol is obtained.

5. The method of obtaining a therapeutic product for inhibiting gastric motility and secretion which comprises admixing urine containing said inhibitor with an agent for separating protein from protein solutions, said agent comprising a substance selected from the group consisting of protein precipitants and protein adsorbents, whereby a protein portion comprising the inhibitor is separated from the urine; and redissolving said protein portion in an aqueous solution, all of said steps being carried out without bringing the composition containing the inhibitor to a boiling temperature for a time sufficient to cause the introduction of substantial amounts of decomposition products.

HEINRICH NECHELES.